United States Patent
Musba et al.

(10) Patent No.: US 11,189,082 B2
(45) Date of Patent: Nov. 30, 2021

(54) SIMULATED OVERHEAD PERSPECTIVE IMAGES WITH REMOVAL OF OBSTRUCTIONS

(71) Applicant: Apple Inc., Cupertino, CA (US)

(72) Inventors: Ibrahim Musba, Santa Clara, CA (US); Jizhou Gao, Fremont, CA (US); Jim Loup Zin, Mountain View, CA (US); Andreas H. Bockert, Sunnyvale, CA (US); Kjell Fredrik Larsson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/007,686

(22) Filed: Aug. 31, 2020

(65) Prior Publication Data
US 2020/0394834 A1    Dec. 17, 2020

Related U.S. Application Data

(63) Continuation of application No. 16/272,133, filed on Feb. 11, 2019, now Pat. No. 10,762,690.

(51) Int. Cl.
| | | |
|---|---|---|
| *G06T 15/20* | (2011.01) | |
| *G06T 7/73* | (2017.01) | |
| *G06K 9/00* | (2006.01) | |
| *G06T 11/00* | (2006.01) | |

(52) U.S. Cl.
CPC ............ *G06T 15/20* (2013.01); *G06K 9/0063* (2013.01); *G06T 7/73* (2017.01); *G06T 11/001* (2013.01); *G06T 2207/10028* (2013.01); *G06T 2215/16* (2013.01)

(58) Field of Classification Search
CPC .................................................... G06T 15/20
See application file for complete search history.

(56) References Cited

U.S. PATENT DOCUMENTS

| | | |
|---|---|---|
| 8,665,263 B2 | 3/2014 | Yoshida et al. |
| 9,384,277 B2 | 7/2016 | Meadow et al. |

(Continued)

OTHER PUBLICATIONS

Devaux, Alexandre & Hoarau, Charlotte & Brédif, Mathieu & Christophe, Sidonie. (2018). 3D Urban Geovisualization: In Situ Augmented and Mixed Reality Experiments. ISPRS Annals of Photogrammetry, Remote Sensing and Spatial Information Sciences. IV-4. 41-48. (Year: 2018).*

(Continued)

*Primary Examiner* — Shivang I Patel
(74) *Attorney, Agent, or Firm* — Young Basile Hanlon & MacFarlane, P.C.

(57) ABSTRACT

A method includes obtaining a three-dimensional model that represents a natural environment and identifying ground-level surfaces from the three-dimensional model, wherein the ground-level surfaces from the three-dimensional model represent ground-level features from the natural environment. The method also includes identifying overhanging features from the three-dimensional model, wherein the overhanging features from the three-dimensional model block visibility of the ground-level surfaces from the three-dimensional model when the ground-level surfaces are viewed from an orthographic perspective. The method also includes rendering a simulated image of the natural environment that includes at least some of the ground-level surfaces from the natural environment using a rendering system that generates the simulated image of the natural environment according to the orthographic perspective and ignores the overhanging features from the three-dimensional model so that the overhanging features from the three-dimensional model are omitted from the simulated image of the natural environment.

21 Claims, 10 Drawing Sheets

(56) References Cited

U.S. PATENT DOCUMENTS

| | | | |
|---|---|---|---|
| 9,679,227 | B2 | 6/2017 | Taylor et al. |
| 2010/0074555 | A1 | 3/2010 | Diaz et al. |
| 2012/0065944 | A1 | 3/2012 | Nielsen et al. |
| 2013/0016896 | A1 | 1/2013 | Seida |
| 2014/0375633 | A1* | 12/2014 | Dillard .................. G06T 17/20 345/420 |
| 2019/0377981 | A1* | 12/2019 | Veeravasarapu ..... G06K 9/6253 |

OTHER PUBLICATIONS

International Search Report and Written Opinion dated Apr. 22, 2020, in pending International Application No. PCT/US2020/015547 (18 pages).

Devaux, A., et al., "3D Urban Geovisualization: In Situ Augmented and Mixed Reality Experiments", ISPRS Annals of the Photogrammetry, Remote Sensing and Spatial Information Sciences, vol. IV-4, 2018, ISPRS TC IV Mid-term Symposium, Oct. 1, 2018 (8 pages).

Boussaha, M., et al., "On the Production of Semantic and Textured 3D Meshes of Large Scale Urban Environments From Mobile Mapping Images and LiDAR Scans", Proceedings of the Reconnaissance des Formes, Image, Apprentissage et Perception (RFIAP), Jan. 1, 2018 (8 pages).

Wikipedia, Anonymous, "Bird's eye view", Dec. 18, 2019, https://en.wikipedia.org/wiki/Bird%27s-eye_view, Downloaded Apr. 8, 2020 (3 pages).

Huang, J., et al., "Interactive Illustrative Rendering on Mobile Devices", IEEE Computer Graphics and Applications, IEEE Service Center, vol. 27, No. 3, May 1, 2007 (9 pages).

\* cited by examiner

SIMULATED OVERHEAD PERSPECTIVE IMAGES WITH REMOVAL OF OBSTRUCTIONS

CROSS-REFERENCE TO RELATED APPLICATIONS

This application is a continuation of U.S. patent application Ser. No. 16/272,133, filed on Feb. 11, 2019, the contents of which is hereby incorporated herein in its entirety for all purposes.

TECHNICAL FIELD

The application relates generally to the field of digital maps.

BACKGROUND

Digital maps store mapping information in a computer-interpretable format and can include and display features similar to those associated with traditional paper maps, such as geographical features, topographical features, political boundaries, attractions, and transportation networks. Photographic images can be combined with mapping information, such as by displaying map features overlaid on an image. This type of display can be used to provide additional information to users of maps or can be used as a basis for annotating maps (i.e., adding additional mapping information) to describe features that can be seen in the image. These images are typically captured using cameras that are carried by satellites or airplanes.

SUMMARY

One aspect of the disclosure is a method that includes obtaining images, obtaining three-dimensional surface measurements, defining a three-dimensional mesh using the three-dimensional surface measurements, texturing the three-dimensional mesh using the images to define a textured three-dimensional mesh, identifying a first portion of the textured three-dimensional mesh, identifying a second portion of the textured three-dimensional mesh that obstructs visibility of part of the first portion of the textured three-dimensional mesh from an overhead perspective, and rendering a simulated overhead perspective image such that the second portion of the textured three-dimensional mesh is not represented in the simulated overhead perspective image.

Another aspect of the disclosure is a non-transitory computer-readable storage device including program instructions executable by one or more processors that, when executed, cause the one or more processors to perform operations. The operations include obtaining images, obtaining three-dimensional surface measurements, defining a three-dimensional mesh using the three-dimensional surface measurements, texturing the three-dimensional mesh using the images to define a textured three-dimensional mesh, identifying a first portion of the textured three-dimensional mesh, identifying a second portion of the textured three-dimensional mesh that obstructs visibility of part of the first portion of the textured three-dimensional mesh from an overhead perspective, and rendering a simulated overhead perspective image such that the second portion of the textured three-dimensional mesh is not represented in the simulated overhead perspective image.

Another aspect of the disclosure is a system that includes a memory and a processor configured to execute instructions stored in the memory. Execution of the instructions causes the processor to obtain images, obtain three-dimensional surface measurements, define a three-dimensional mesh using the three-dimensional surface measurements, texture the three-dimensional mesh using the images to define a textured three-dimensional mesh, identify a first portion of the textured three-dimensional mesh, identify a second portion of the textured three-dimensional mesh that obstructs visibility of part of the first portion of the textured three-dimensional mesh from an overhead perspective, and render a simulated overhead perspective image such that the second portion of the textured three-dimensional mesh is not represented in the simulated overhead perspective image.

DETAILED DESCRIPTION

Figure 1:
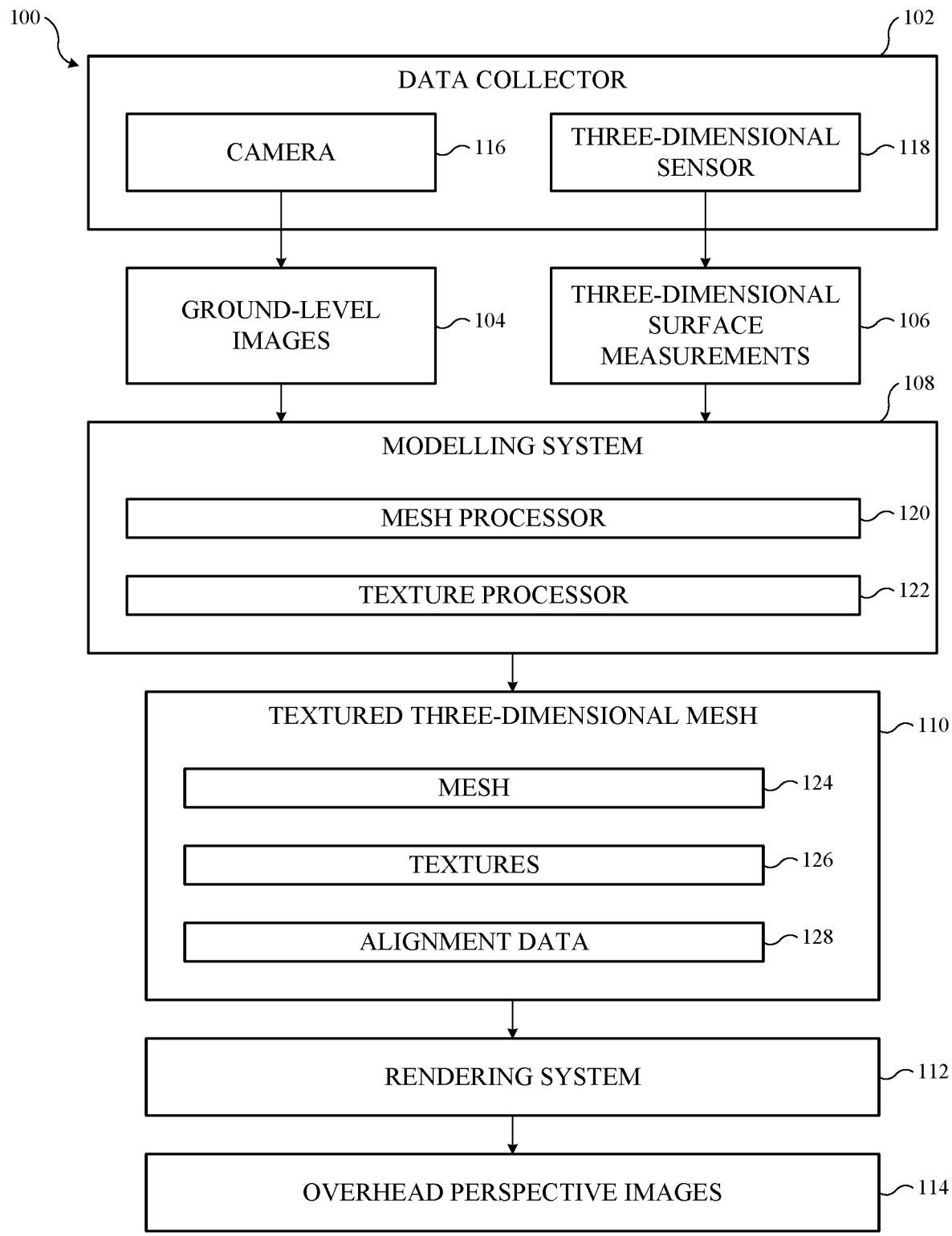
FIG. 1 is a block diagram that shows a system for generating images from an overhead perspective using images captured at ground level.

Images that are captured using cameras that are carried by satellites or airplanes may lack some features because of sight line obstructions that are present between the features and the camera. Features that are present near the ground surface may be referred to herein as ground-level features, with the term "ground-level" indicating proximity to the ground surface. As one example, features of a tree-lined roadway may be occluded by a tree canopy. As another example, buildings may include overhanging structures that occlude ground-level features. As another example, features of a roadway will be occluded in the area where an overpass is present above the roadway.

The disclosure herein is directed to generating images from simulated overhead perspective using images captured at ground level and three-dimensional surface measurements that are captured at ground level. The images that are generated by the systems and methods that are described herein are created using photographic images and resemble photographs but are generated using three-dimensional rendering techniques and are not actual photographs.

Images that are captured at ground level may be referred to herein as ground-level images and are typically captured using cameras that are supported by persons or vehicles that are near the ground surface, such as cars, persons, or low-flying aerial vehicles. One example of a low-flying aerial vehicle is a quadrotor drone flying at an altitude that is lower than nearby objects that would occlude aerial photographs (e.g., below a tree canopy height), such as twenty feet or less above the ground surface. The camera optical axis orientation at which ground-level images are captured may be a generally horizontal orientation, such as an orientation between forty-five degrees above horizontal and forty-five degrees below horizontal.

In the systems and methods that are described herein, images and three-dimensional surface measurements are obtained in an area from ground level with a sensor orientation that is generally horizontal (e.g., an orientation between forty-five degrees above horizontal and forty-five degrees below horizontal). The three-dimensional surface measurements are used to define a three-dimensional mesh. The images are aligned spatially relative to the three-dimensional mesh to defines textures for the three-dimensional mesh to define a textured three-dimensional mesh. The textured three-dimensional mesh is rendered from an overhead perspective. One example of an overhead perspective is an orthographic perspective in which an image is generated by projection of light from the surface being rendered to a projection plane along projection lines that are oriented in a direction that is perpendicular to the plane. During rendering, overhanging features from the three-dimensional mesh can be ignored. Ignoring features from the three-dimensional mesh means that the rendering system renders the textured three-dimensional mesh in a manner that causes the features to be absent from the image that is generated by the rendering system. As a result, overhanging features are absent from the rendered image, and ground-level features can be represented without occlusions. In some implementations, an elevation can be selected for rendering, such as in the case of overpasses or multi-level roadways.

FIG. 1 is a block diagram that shows a system 100 for generating images from an overhead perspective using images captured at ground level. In the illustrated implementation, the system 100 includes a data collector 102 that obtains ground-level images 104 and three-dimensional surface measurements 106 that are provided to a modelling system 108 as inputs. The modelling system 108 generates a three-dimensional model, such as a textured three-dimensional mesh 110, using the ground-level images 104 and the three-dimensional surface measurements 106. The textured three-dimensional mesh 110 is provided as an input to a rendering system 112, which generates simulated overhead perspective images 114 using the textured three-dimensional mesh 110.

The data collector 102 is a physical system that is mobile and is configured to travel in a natural environment while obtaining information. As one example, the data collector 102 may be implemented in the form of data collection components that are carried by a road-going vehicle during a data collection operation. As another example, the data collector 102 may be implemented in the form of data collection components that are housed in and supported by a backpack that is carried by a person during a data collection operation. As another example, the data collector 102 may be implemented in the form of data collection components that are carried by an unmanned aerial vehicle (e.g., a quadrotor drone).

The natural environment is a real-world (i.e., not simulated) environment. As one example, a data collection operation may involve traversing a roadway network to obtain two-dimensional data and three-dimensional data that describe portions of the roadway network, such as the locations and configurations of a roadway, pavement markings, traffic control signs, traffic control signals, bicycle lanes, sidewalks, and features located on land that is adjacent to the roadway, such as trees and buildings.

The data collector 102 includes a camera 116 and a three-dimensional sensor 118. The camera 116 and the three-dimensional sensor 118 are configured to obtain information (e.g., images and point clouds) that describe a natural environment around the data collector 102. The information that is obtained by the data collector 102 may be stored (e.g., using a non-volatile storage device) for further processing by another system, such as the modelling system 108.

The camera 116 is an image sensing device that is operable to obtain the ground-level images 104. As examples, the camera 116 may be a digital still-image camera or a digital video camera of any type. The camera 116 is operable to output images, including the ground-level images 104, in any suitable form, such as in the form of information that defines an array of pixels that each have a color value.

The three-dimensional sensor 118 may be implemented using known technologies that are able to identify the presence and location of surfaces in three-dimensional space, and to output information corresponding to the presence and location of surfaces in three-dimensional space as the three-dimensional surface measurements 106. Examples of sensors that can be used to implement the three-dimensional sensor 118 include LIDAR sensors, structured light stereo sensors, and stereo cameras. Other types of sensors can be used to implement the three-dimensional sensor 118, and the three-dimensional sensor 118 may include multiple sensors of various types. The information output by the three-dimensional sensor 118 includes the three-dimensional surface measurements 106, which may be in the form of a point cloud (i.e., locations expressed in three-dimensional coordinates or another suitable form that indicate presence of a surface at the location) or may be in any other suitable form.

The modelling system 108 is configured to process information that is received from the data collector 102 to generate a digital model of the natural environment that was traversed by the data collector 102 during the data collection operation. In the illustrated example, the modelling system 108 includes a mesh processor 120 and a texture processor 122. The output of the modelling system 108 is the textured three-dimensional mesh 110, which may include a mesh 124, textures 126, and alignment data 128.

The mesh processor 120 of the modelling system 108 is configured to receive the three-dimensional surface measurements 106 as an input and produces the mesh 124 as an output. The mesh 124 is computer-interpretable model that represents surfaces from the natural environment in a form that can be rendered by a rendering engine, for example, for use in visualization, image capture, or simulation. The mesh 124 may be stored as information using data formats that are well-known in the field of computer graphics, such as in the form of surfaces that are defined by interconnected triangles having vertices. The mesh 124 may include additional information, such as surface normals.

To define the mesh 124, the mesh processor 120 uses the three-dimensional surface measurements 106 to estimate the locations and orientations or surfaces (and portions of surfaces). The mesh processor 120 can be implemented using any of a large number of known algorithms that estimate the locations and orientations of surfaces from three-dimensional measurements such as point clouds. For example, some techniques identify a grouping of points from a point cloud, and define a surface portion (e.g., a triangular plane defined by three vertices) that is, on average, tangential to lines constructed between pairs of the points. Examples of techniques that can be utilized by the mesh processor 120 include Poisson surface reconstruction and generalized distance functions.

The texture processor 122 is operable to determine spatial correspondence between portions of the mesh 124 and portions of the ground-level images 104. This correspondence is used to generate the texture 126 using the ground-level images 104 and to generate the alignment data 128.

The texture 126 is an image that is based on the ground-level images 104 and defines that colors that will be applied to the surfaces of the mesh 124. The texture for a portion of the mesh 124 may be defined based on a single one of the ground-level images 104, or from multiple ones of the ground-level images 104 (e.g., captured from difference perspectives). As an example, using a known geometric relationship between the camera 116 and the three-dimensional sensor 118, the mesh 124 can be projected into image space relative to each of the ground-level images 104. In an implementation in which the mesh 124 is defined by triangles, projecting the vertices of the triangles into image space results in two-dimensional image-space coordinates for each of the vertices of the mesh 124.

The locations of the vertices of the mesh 124, when projected into image space relative to the ground-level images 104, define a patch (e.g., a triangular portion) of one of the ground-level images 104 that can be incorporated in the texture 126 to represent the coloration of the corresponding portion of the mesh 124. As examples, a portion of one of the ground-level images 104 can be copied into the texture 126 or can be combined with portions from other ones of the ground-level images (such as by averaging). The position of this part of the texture 126 defines the alignment data 128, which describes how the texture 126 is applied to the mesh 124. As an example, the alignment data 128 can be implemented according to known UV mapping techniques. Using the alignment data 128, the texture 126 can be applied to the mesh 124 to texture the mesh 124 in a manner that is representative of the real-world appearance of the objects that are represented in the mesh 124. Thus, the mesh 124, the texture 126, and the alignment data 128 cooperate to define the textured three-dimensional mesh 110.

In the implementations that are described herein, the modelling system 108 utilizes information collected by the data collector 102 after the conclusion of the data collection operation to generate the digital model of the natural environment. In alternative implementations, the modelling system 108 could be configured to operate in real-time, by transmitting information from the data collector 102 to the modelling system 108 as it is obtained and generating portions of the digital model as information is received from the data collector 102.

The rendering system 112 generates the simulated overhead perspective images 114 using the textured three-dimensional mesh 110. The rendering system 112 is configured to generate two-dimensional images that represent the appearance of the textured three-dimensional mesh 110 from an overhead point-of-view. As an example, the rendering system 112 may be configured to generate the simulated overhead perspective images 114 using an orthographic projection. In orthographic projection, images are generated from the perspective of a projection plane along projection lines that are oriented orthogonal to the projection plane. The projection plane may be positioned such that it is located above the textured three-dimensional mesh 110, at an orientation that is parallel to a datum elevation (e.g., sea level), a local elevation relative to the textured three-dimensional mesh 110, a plane constructed based on an average surface elevation in the textured three-dimensional mesh 110, or a plane constructed based on any other criteria.

As will be described herein, the rendering system 112 is configured to analyze the textured three-dimensional mesh 110 to identify occluded portions of a ground surface that is represented by the textured three-dimensional mesh 110 and features that are formed on the ground surface (e.g., roads, curbs) or are located in close proximity to the ground surface. The rendering system 112 may determine whether render the simulated overhead perspective images 114 such that features in the textured three-dimensional mesh 110 that are occluding portions that represent the ground surface are omitted from the simulated overhead perspective images 114. By omitting the occluding features of the textured three-dimensional mesh 110 from the simulated overhead perspective images 114, ground-level features that otherwise would not be visible (e.g., from an aerial photograph) are made visible in the simulated overhead perspective images 114. Rendering operations in which occluding features from the textured three-dimensional mesh 110 are omitted from the simulated overhead perspective images 114 will be explained in detail herein.

Figure 2:
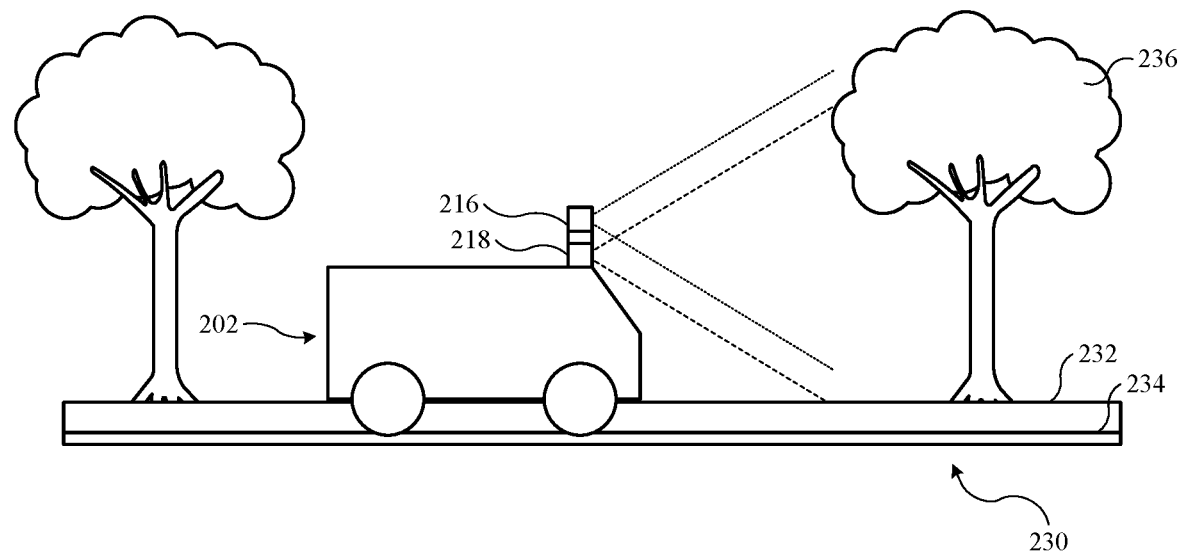
FIG. 2 is an illustration that shows a data collector performing a data collection operation in a natural environment according to a first example.

FIG. 2 is an illustration that shows a data collector 202 performing a data collection operation in a natural environment 230 according to a first example.

In the illustrated example, the natural environment 230 includes a ground surface 232, a roadway 234, and trees 236. If viewed from above, the trees 236 would obstruct view of portions of the ground surface 232 and the roadway 234.

The data collector 202 is an implementation of the data collector 102, and the description of the data collector 102 is applicable to the data collector 202 except as otherwise noted herein. In the illustrated example, the data collector 202 is a road going vehicle (e.g., an automobile) that is configured to travel on a roadway and is supported with respect to the roadway by wheels.

The data collector 202 includes a camera 216 and a three-dimensional sensor 218 that are implemented in the manner described with respect to the camera 116 and the three-dimensional sensor 118. The camera 216 and the three-dimensional sensor 218 obtain information (e.g., images and point clouds) describing the natural environment from a ground-level perspective. For example, the camera 216 and the three-dimensional sensor 218 may supported by the data collector 202 in a generally-horizontal orientation, such as orientations in which the central axes of sensing fields of the camera 216 and the three-dimensional sensor 218 are within forty-five degrees above or below horizontal. The camera 216 and three-dimensional sensor 218 may obtain information while the data collector 202 traverses the natural environment 230, such as by driving along the roadway 234. This information is stored for later processing, for example, as described with respect to the system 100.

Figure 3:
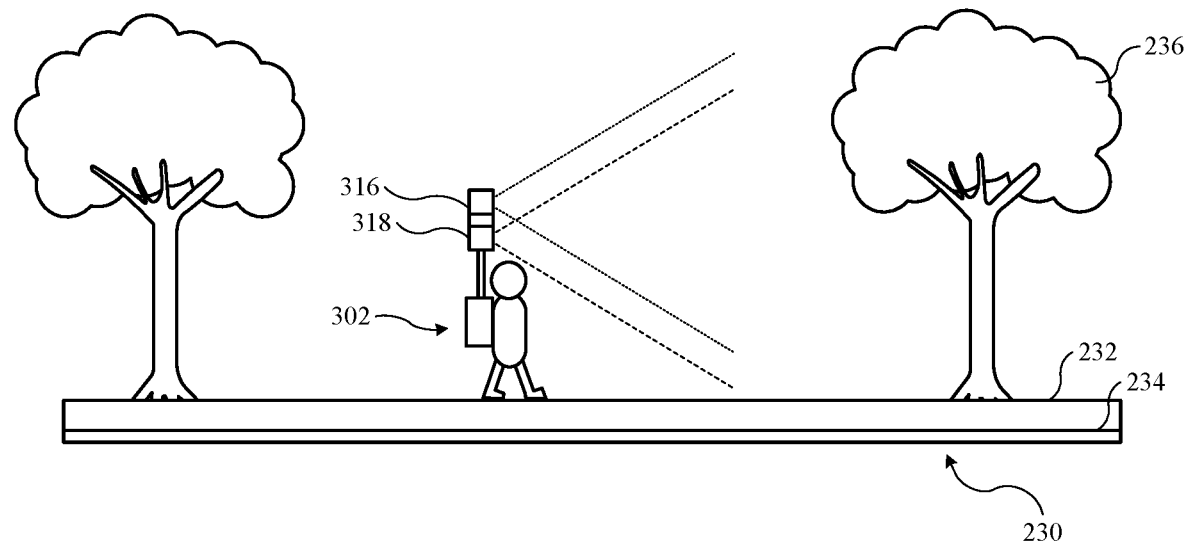
FIG. 3 is an illustration that shows a data collector performing a data collection operation in a natural environment according to a second example.

FIG. 3 is an illustration that shows a data collector 302 performing a data collection operation in the natural environment 230 according to a second example.

The data collector 302 is an implementation of the data collector 102, and the description of the data collector 102 is applicable to the data collector 302 except as otherwise noted herein. In the illustrated example, the data collector 302 is implemented in the form of a backpack that is carried by a person and supports a camera 316 and a three-dimensional sensor 318 that are implemented in the manner described with respect to the camera 116 and the three-dimensional sensor 118. Operation of the data collector 302 is similar to operation of the data collector 202. For example, the camera 316 and three-dimensional sensor 318 may obtain information while the data collector 202 traverses the natural environment 230 as the person walks along a sidewalk or other pedestrian facility. This information is stored for later processing, for example, as described with respect to the system 100.

Figure 4:
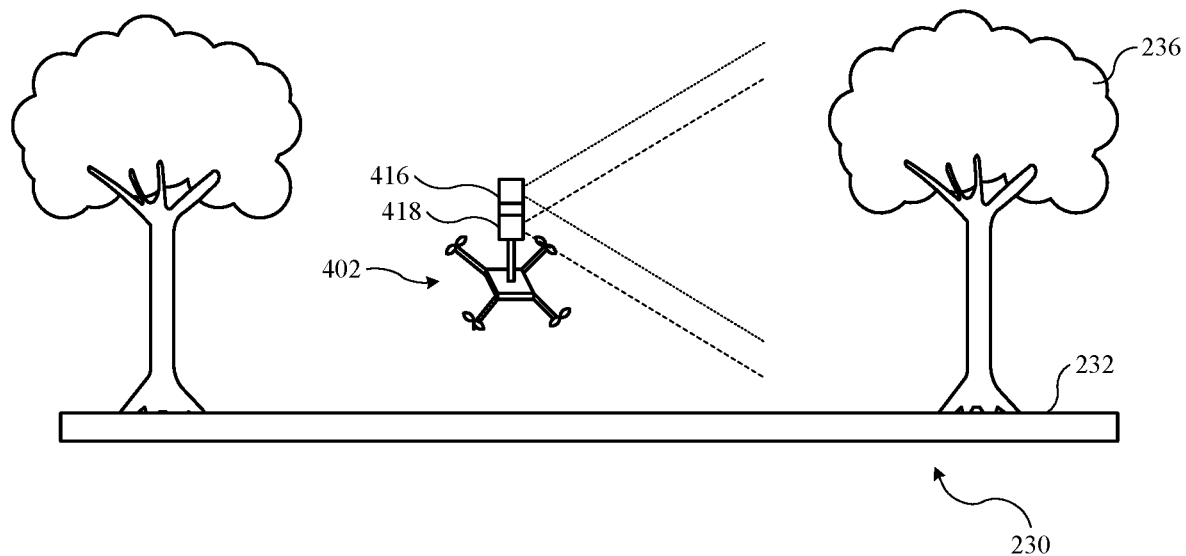
FIG. 4 is an illustration that shows a data collector performing a data collection operation in a natural environment according to a third example.

FIG. 4 is an illustration that shows a data collector 402 performing a data collection operation in a natural environment 230 according to a third example.

The data collector 402 is an implementation of the data collector 102, and the description of the data collector 102 is applicable to the data collector 402 except as otherwise noted herein. In the illustrated example, the data collector 402 is implemented in the form of an unmanned aerial vehicle (e.g., a quadrotor drone) that supports a camera 416 and a three-dimensional sensor 418. The camera 416 and the three-dimensional sensor 418 are implemented in the manner described with respect to the camera 116 and the three-dimensional sensor 118. Operation of the data collector 402 is similar to operation of the data collector 202. For example, the camera 416 and three-dimensional sensor 418 may obtain information while the data collector 202 traverses the natural environment 230 as the unmanned aerial vehicle flies above the ground surface 232. This information is stored for later processing, for example, as described with respect to the system 100.

Figure 5:
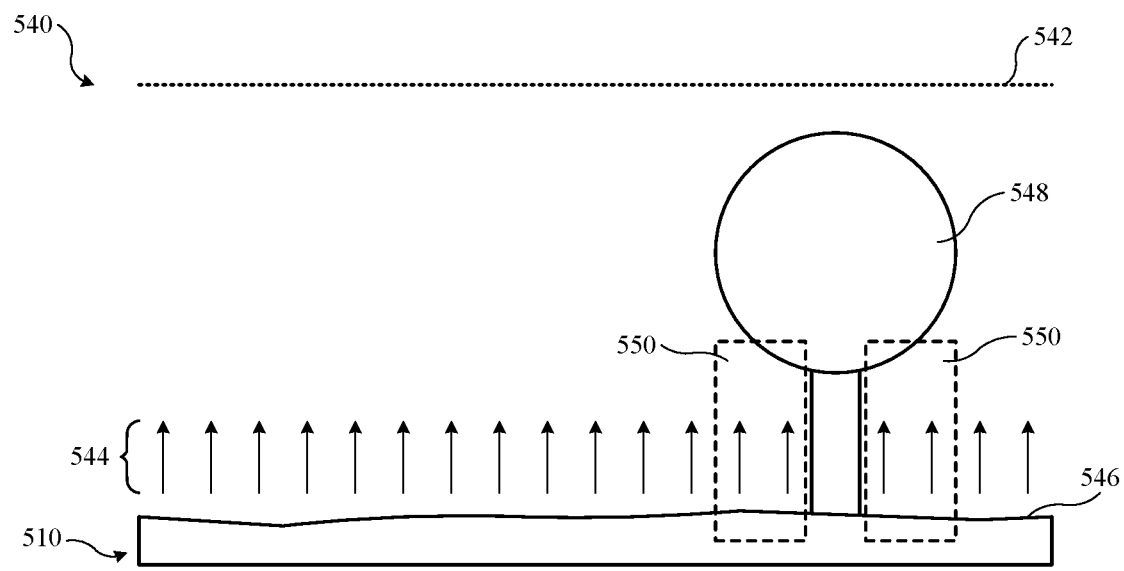
FIG. 5 is an illustration that shows a rendering operation according to a first example with occluding objects present.
Figure 6:
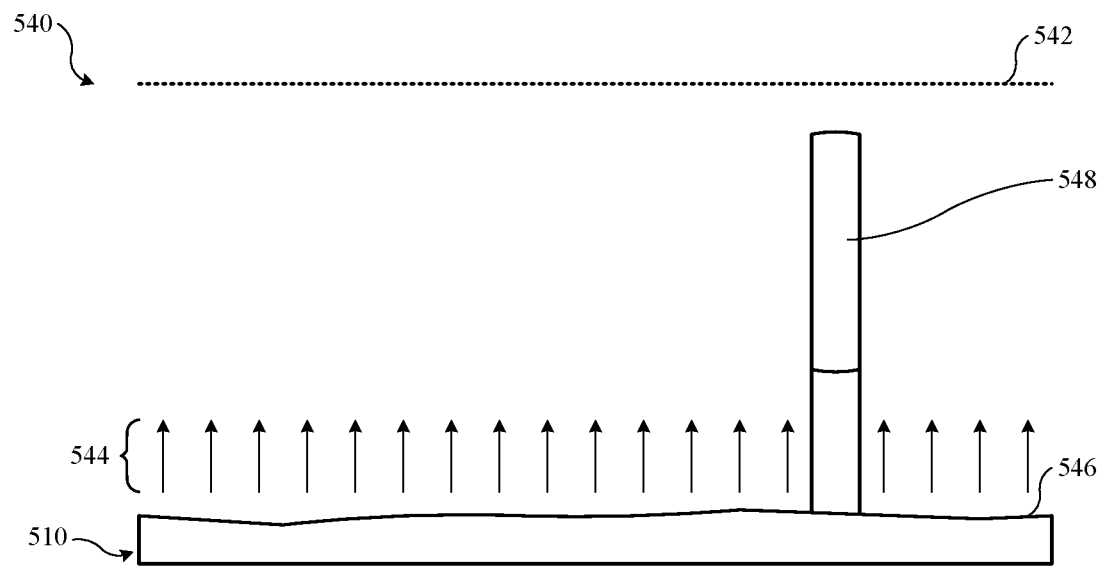
FIG. 6 is an illustration that shows the rendering operation according to the first example with occluding objects removed.

FIG. 5 is an illustration that shows a rendering operation 540 according to a first example with occluding objects present, and FIG. 6 is an illustration that shows the rendering operation 540 according to the first example with the occluding objects removed.

The rendering operation 540 may be performed by the rendering system 112 to generate the simulated overhead perspective images 114. The rendering operation 540 is performed with respect to a textured three-dimensional mesh 510, which may be generated in the manner described with respect to the textured three-dimensional mesh 110.

The rendering operation 540 may utilize a projection plane 542 to form the simulated overhead perspective images 114 by simulating projection of light from the textured three-dimensional mesh 510 along projection lines 544 that extend generally perpendicular to the projection plane 542. In the illustrated example, the textured three-dimensional mesh 510 includes a ground portion 546 and an object portion 548. In the illustrated example, the ground portion 546 represents a ground surface from the natural environment and the object portion 548 represents a tree from the natural environment.

The object portion 548 is located above the ground portion 546 and is partially obstructing visibility of the ground portion 546 from the projection plane 542 along the projection lines in obstructed areas 550 that are located between the ground portion 546 and the object portion 548. The rendering system 112 is configured to identify the obstructed areas 550. For example, the rendering system 112 may be configured to identify the obstructed areas by projection of the projection lines 544 from the ground portion 546 toward the projection plane 542, detecting collision of some of the projection lines 544 with the object portion 548, and identifying the corresponding area as one of the obstructed areas 550.

As shown in FIG. 6, the parts of the object portion 548 that are located in the obstructed areas 550 are ignored by the rendering system 112. As one example, the rendering system 112 may ignore some or all of the object portion 548 by modifying the textured three-dimensional mesh 510 to remove some or all of the object portion 548 from the textured three-dimensional mesh 510. As another example, the rendering system 112 may ignore some or all of the object portion 548 by associating information with some or all of the object portion 548 from the textured three-dimensional mesh 510 that causes the rendering system 112 to treat those portions of the textured three-dimensional mesh 510 as non-obstructing (e.g., by allowing simulated light to be projected through those portions of the textured three-dimensional mesh 510 along the projection lines 544) during generation of the simulated overhead perspective images 114. As another example, the rendering system may ignore some or all of the object portion 548 by modifying the textured three-dimensional mesh 510 to apply a shader to some or all of the object portion 548 from the textured three-dimensional mesh 510 that causes those portions of the textured three-dimensional mesh 110 to be non-visible during rendering.

Figure 7:
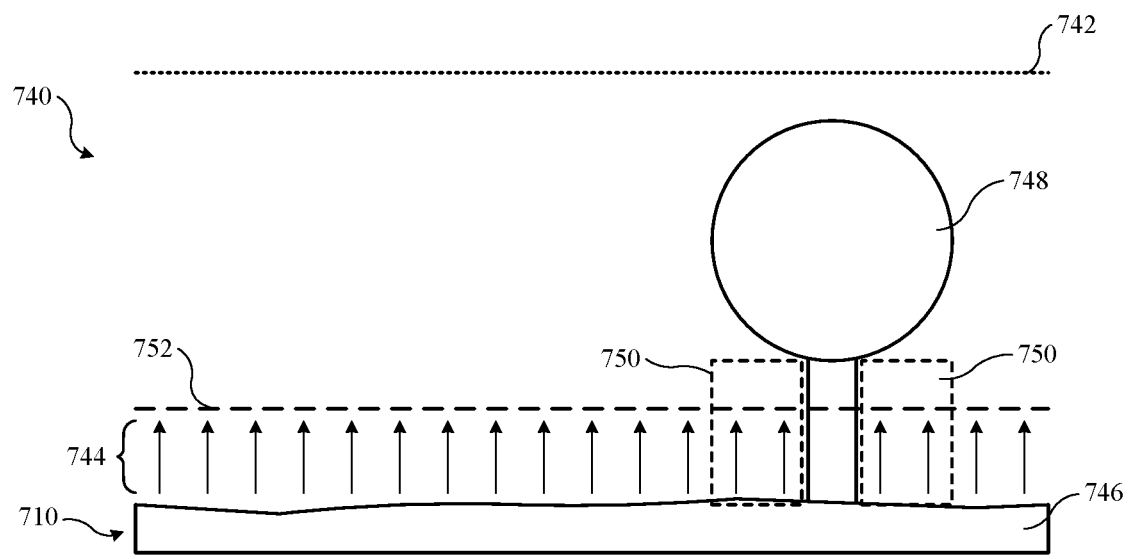
FIG. 7 is an illustration that shows a rendering operation according to a second example with occluding objects present.
Figure 8:
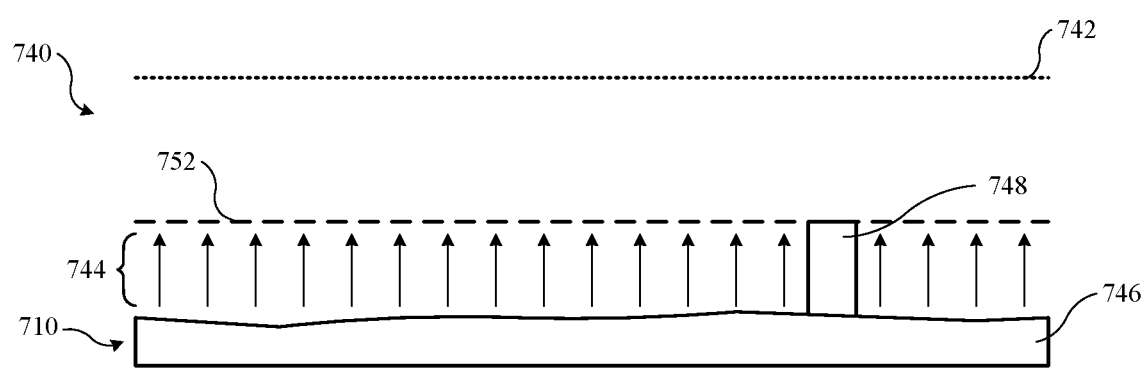
FIG. 8 is an illustration that shows the rendering operation according to the second example with occluding objects removed.

FIG. 7 is an illustration that shows a rendering operation 740 according to a second example with occluding objects present, and FIG. 8 is an illustration that shows the rendering operation 740 according to the second example with occluding objects removed.

The rendering operation 740 may be performed by the rendering system 112 to generate the simulated overhead perspective images 114. The rendering operation 740 is performed with respect to a textured three-dimensional mesh 710, which may be generated in the manner described with respect to the textured three-dimensional mesh 110.

The rendering operation 740 may utilize a projection plane 742 to form the simulated overhead perspective images 114 by simulating projection of light from the textured three-dimensional mesh 710 along projection lines 744 that extend generally perpendicular to the projection plane 742. In the illustrated example, the textured three-dimensional mesh 710 includes a ground portion 746 and an object portion 748. In the illustrated example, the ground portion 746 represents a ground surface from the natural environment and the object portion 748 represents a tree from the natural environment.

The object portion 748 is located above the ground portion 746 and is partially obstructing visibility of the ground portion 746 from the projection plane 742 along the projection lines 744 in obstructed areas 750 that are located between the ground portion 746 and the object portion 748. The rendering system 112 is configured to identify the object portion 748 and restore visibility of the obstructed areas 750 using a clipping plane 752. The clipping plane 752 is constructed by determining a maximum height of the ground portion 746 in an area of the textured three-dimensional mesh 710 and setting the elevation of the clipping plane 752 based on the maximum elevation of the ground portion 746 of the textured three-dimensional mesh 710 in the area. For example, the rendering system 112 may set the elevation of the clipping plane 752 such that the clipping plane 752 is slightly above the ground portion 746 of the textured three-dimensional mesh 710 but below obstructions that would occlude visibility of the ground portion 746 of the textured three-dimensional mesh 710 from the projection plane 742 along the projection lines 744.

As shown in FIG. 8, the parts of the textured three-dimensional mesh 710, which in this example is part of the object portion 748, that are located above the clipping plane 752 are ignored by the rendering system 112. As one example, the rendering system 112 may ignore some or all of the object portion 748 by modifying the textured three-dimensional mesh 710 to remove the part of the object portion 748 that is located above the clipping plane 752 from the textured three-dimensional mesh 710. As another example, the rendering system 112 may ignore the part of the object portion 748 that is located above the clipping plane 752 by associating information with the part of the object portion 748 that is located above the clipping plane 752 that causes the rendering system 112 to treat those portions of the textured three-dimensional mesh 710 as non-obstructing during generation of the simulated overhead perspective images 114. As another example, the rendering system 112 may ignore the part of the object portion 748 that is located above the clipping plane 752 by modifying the textured three-dimensional mesh 710 to apply a shader to some or all of the object portion 748 from the textured three-dimensional mesh 710 that causes the part of the object portion 748 that is located above the clipping plane 752 to be non-visible during rendering. As another example, the rendering system 112 may ignore the part of the object portion 748 that is located above the clipping plane 752 by moving the projection plane 742 to the elevation of the clipping plane 752 such that the projection plane 742 is located below the obstructions.

Figure 9:
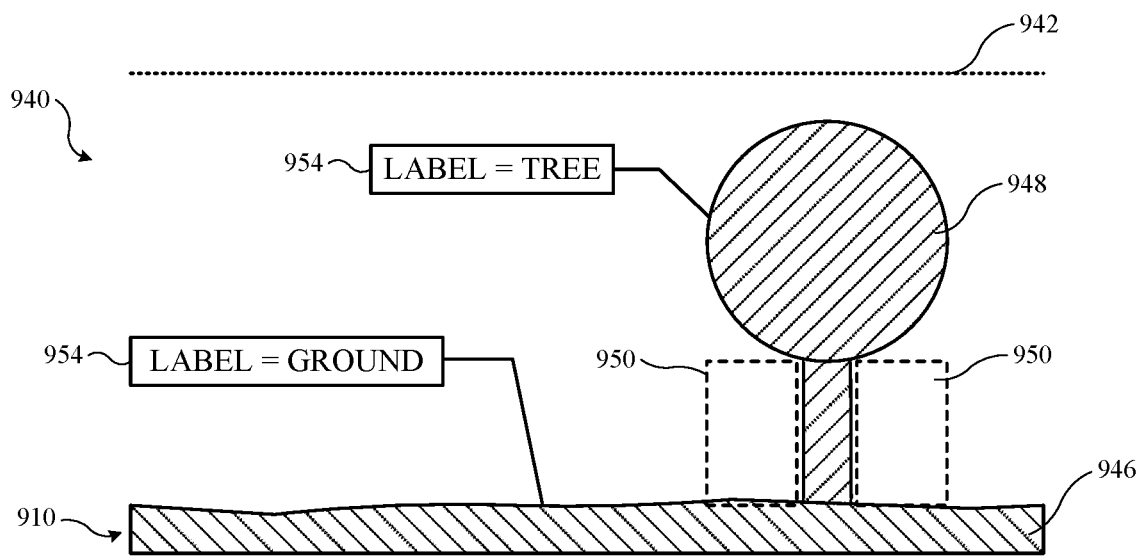
FIG. 9 is an illustration that shows a rendering operation according to a third example with occluding objects present.
Figure 10:
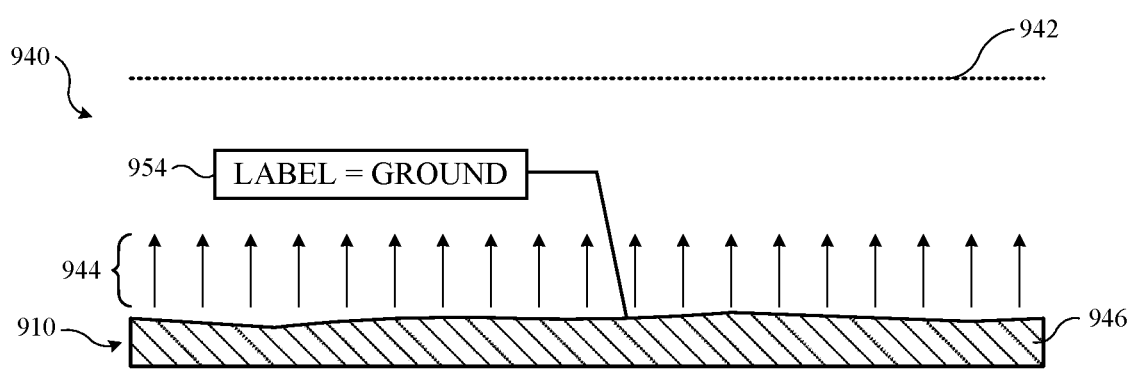
FIG. 10 is an illustration that shows the rendering operation according to the third example with occluding objects removed.

FIG. 9 is an illustration that shows a rendering operation 940 according to a third example with occluding objects present, and FIG. 10 is an illustration that shows the rendering operation 940 according to the third example with occluding objects removed.

The rendering operation 940 may be performed by the rendering system 112 to generate the simulated overhead perspective images 114. The rendering operation 940 is performed with respect to a textured three-dimensional mesh 910, which may be generated in the manner described with respect to the textured three-dimensional mesh 110.

The rendering operation 940 may utilize a projection plane 942 to form the simulated overhead perspective images 114 by simulating projection of light from the textured three-dimensional mesh 910 along projection lines 944 that extend generally perpendicular to the projection plane 942. In the illustrated example, the textured three-dimensional mesh 910 includes a ground portion 946 and an object portion 948. In the illustrated example, the ground portion 946 represents a ground surface from the natural environment and the object portion 948 represents a tree from the natural environment.

The object portion 948 is located above the ground portion 946 and is partially obstructing visibility of the ground portion 946 from the projection plane 942 along the projection lines in obstructed areas 950 that are located between the ground portion 946 and the object portion 948. The rendering system 112 is configured to identify the object portion 948 and restore visibility of the obstructed areas 950 by applying semantic labels 954 to portions of the textured three-dimensional mesh 910 and determining whether to ignore portions of the textured three-dimensional mesh 910 based on the semantic labels 954. The semantic labels 954 are used to describe the types of features that are present in the textured three-dimensional mesh 910. For example, each of the semantic labels 954 can be associated with an object classification. Association of one of the semantic labels 954 with a portion of the textured three-dimensional mesh 910 indicates that the indicated portion of the textured three-dimensional mesh 910 corresponds to the object type that is represented by the semantic label 954. In the illustrated example, a first one of the semantic labels 954 identifies the ground portions 946 using the label "ground" and a second one of the semantic labels 954 identifies the object portion 948 using the label "tree."

As one example, the semantic labels 954 can be applied by an automated classifier system. An automated classifier system is able to identify objects using information such as images and point clouds, and is able to determine classifications, such as the semantic labels 954, for the identified objects. An automated classifier system may be implemented according to known methods. As one example, an automated classifier system may be implemented using a trained machine-learning model, such as a trained deep neural network. In alternative implementations, the semantic labels 954 may be applied by manual classification.

As shown in FIG. 10, portions of the textured three-dimensional mesh 910 can be ignored by the rendering system 112 based on the semantic labels 954. In the illustrated example, portions of the textured three-dimensional mesh 910 that have been indicated with the semantic label 954 that corresponds to "tree" are ignored. As one example, the rendering system 112 may ignore part of the textured three-dimensional mesh 910 by modifying the textured three-dimensional mesh 910 to remove the parts indicated based on the semantic labels 954. As another example, the rendering system 112 may associate information with the part of the textured three-dimensional mesh 910 indicated by the semantic labels 954 that causes the rendering system 112 to treat those portions of the textured three-dimensional mesh 910 as non-obstructing during generation of the simulated overhead perspective images 114. As another example, the rendering system 112 may ignore the part of the textured three-dimensional mesh 910 based on the semantic labels 954 by modifying the textured three-dimensional mesh 910 to apply a shader to some or all of the object portion 948 from the textured three-dimensional mesh 910 that causes the portions indicated by the semantic labels 954 to be non-visible during rendering.

Figure 11:
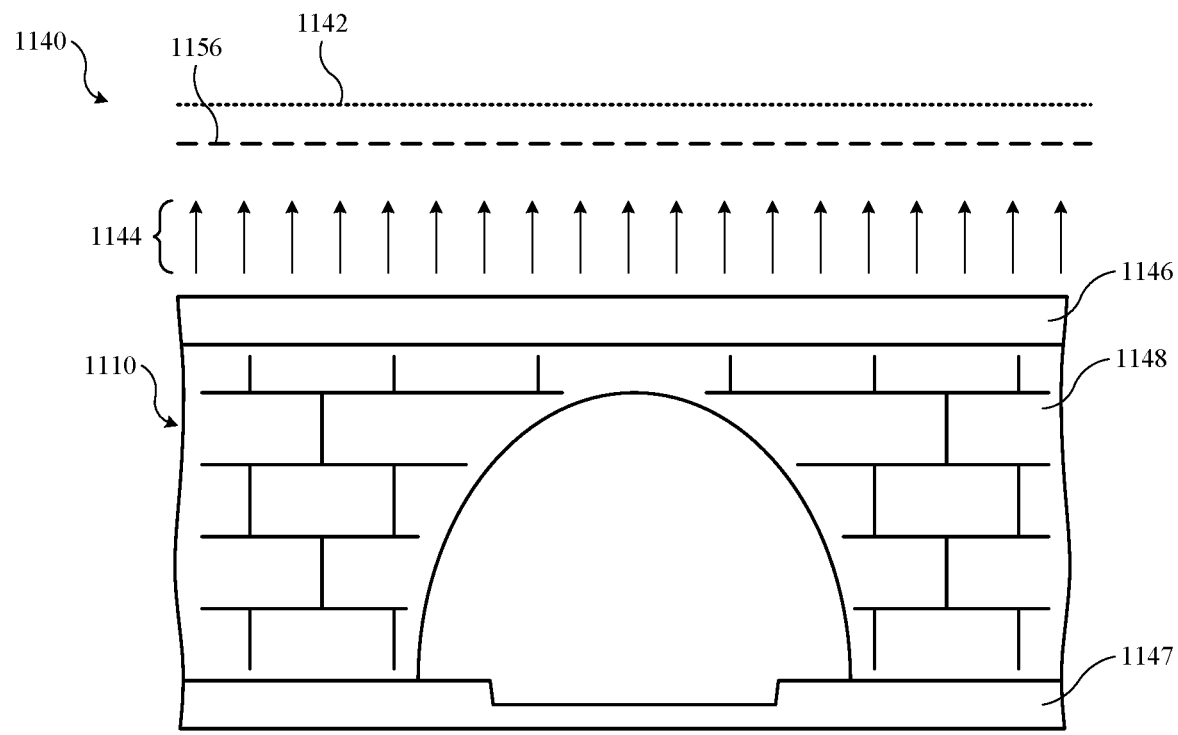
FIG. 11 is an illustration that shows a rendering operation according to a fourth example with occluding objects present.
Figure 12:
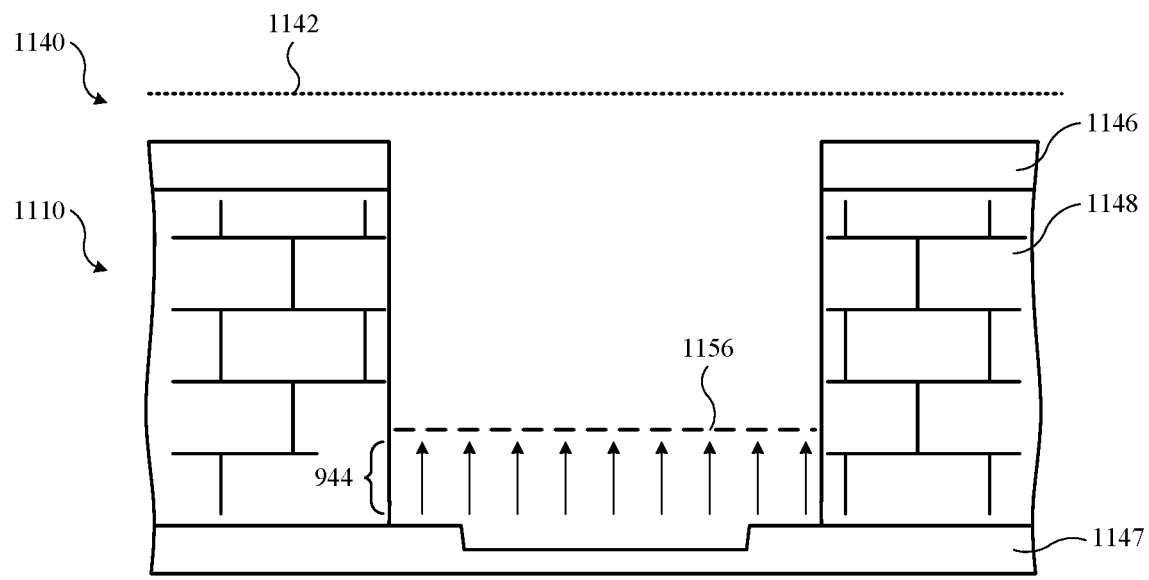
FIG. 12 is an illustration that shows the rendering operation according to the fourth example with occluding objects removed.

FIG. 11 is an illustration that shows a rendering operation 1140 according to a fourth example with occluding objects present, and FIG. 12 is an illustration that shows the rendering operation 1140 according to the fourth example with occluding objects removed.

The rendering operation 1140 may be performed by the rendering system 112 to generate the simulated overhead perspective images 114. The rendering operation 1140 is performed with respect to a textured three-dimensional mesh 1110, which may be generated in the manner described with respect to the textured three-dimensional mesh 110.

The rendering operation 1140 may utilize a projection plane 1142 to form the simulated overhead perspective images 114 by simulating projection of light from the textured three-dimensional mesh 1110 along projection lines 1144 that extend generally perpendicular to the projection plane 1142. In the illustrated example, the textured three-dimensional mesh 1110 includes a first ground portion 1146, a second ground portion 1147, and an object portion 1148. In the illustrated example, the first ground portion 1146 and the second ground portion 1147 represent ground surfaces from the natural environment and the object portion 1148 represents a structure (e.g., a bridge) that is supporting the first ground portion 1146 above the second ground portion 1147 such that the first ground portion 1146 and the object portion 1148 are obstructing view of part of the second ground portion from the projection plane 1142 along the projection lines 1144.

The rendering system 112 is configured to select whether to make the first ground portion 1146 or the second ground portion 1147 visible in the simulated overhead perspective images 114. As an example, the rendering system 112 may generate a first group of one or more of the simulated overhead perspective images 114 in which the first ground portion 1146 is visible with part of the second ground portion 1147 occluded, and a second group of one or more of the simulated overhead perspective images 114 in which the second ground portion 1147 is visible and part of the first ground portion 1146 is ignored and part of the object portion 1148 is ignored.

The rendering system 112 may utilize a reference plane 1156 for determining which portions of the textured three-dimensional mesh 1110 to ignore. The rendering system 112 ignores obstructing objects that are located above the reference plane 1156. Obstructing objects that are located above the reference plane can be ignored using any of the methods described in previous examples. In FIG. 11, the rendering system 112 has placed the reference plane 1156 above the first ground portion 1146, the second ground portion 1147, and the object portion 1148. As a result, the image rendered by the rendering system 112 shows the first ground portion 1146 with part of the second ground portion 1147 obstructed. In FIG. 12, the rendering system 112 has placed the reference plane 1156 below the first ground portion 1146 and the object portion 1148, and above the second ground portion 1147. As a result, the image rendered by the rendering system 112 omits part of the first ground portion 1146 and shows the part of the second ground portion 1147 that was obstructed in the example shown in FIG. 11.

Figure 13:
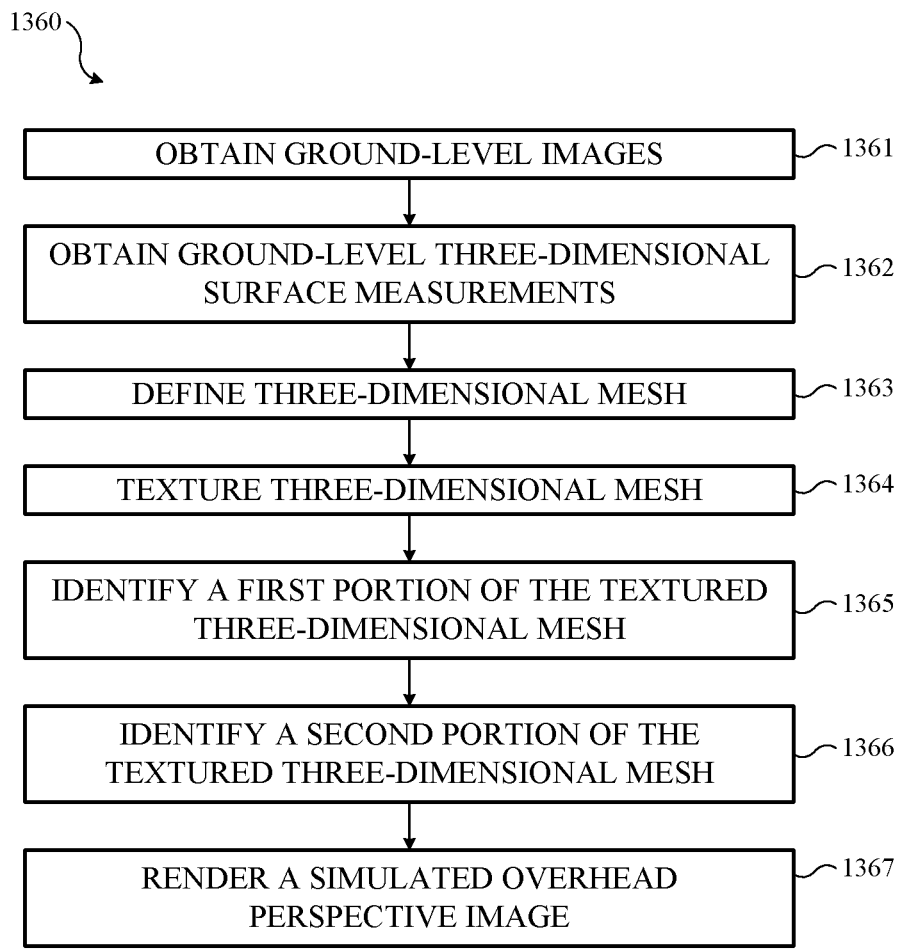
FIG. 13 is a flowchart that shows a process for generating images from an overhead perspective using images captured at ground level.

FIG. 13 is a flowchart that shows a process 1360 for generating images from an overhead perspective using images captured at ground level. The process 1360 can be used to generate the simulated overhead perspective images 114. The process 1360 can be performed using the system 100, and operations of the process 1360 can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 1360 as described herein.

Operation 1361 includes obtaining ground-level images. The ground-level images may each be associated with a known location and orientation from which the ground-level images were obtained. Obtaining the ground level images may be performed by accessing the images from a storage device, receiving the images in a data transmission, or capturing the images using an imaging device such as a camera that is located at ground level, previously described with respect to the data collector 102, the ground-level images 104, and the camera 116.

Operation 1362 includes obtaining ground-level three-dimensional surface measurements. Obtaining three-dimensional surface measurements may be performed by accessing the images from a storage device, receiving the images in a data transmission, or capturing the measurements at ground-level using a three-dimensional sensor. As an example, a LIDAR sensor may be used to obtain the ground-level three-dimensional surface measurements. Operation 1362 may be performed in the manner described with respect to the data collector 102, the three-dimensional surface measurements 106, and the three-dimensional sensor 118.

The ground-level three-dimensional surface measurements may be in any suitable data form, such as a data form in which the three-dimensional surface measurements define a point cloud. The ground-level three-dimensional surface measurements may include information that describes points in three-dimensional space at which a surface is present, such as XYZ coordinates. The locations of the three-dimensional surface measurements correspond to the locations of the ground-level images. Thus, at least some of the three-dimensional surface measurements correspond to surfaces that are depicted in one or more of the ground-level images.

Operation 1363 includes defining a three-dimensional mesh. The three-dimensional mesh is defined using the three-dimensional surface measurements that were obtained in operation 1362. Operation 1363 can be generated according to known methods that determine a mesh for surface location samples, such as a point cloud. As an example operation 1363 can be performed in the manner described with respect to the mesh processor 120 of the modelling system 108 and the mesh 124.

Operation 1364 includes texturing the three-dimensional mesh. The three-dimensional mesh is textured using the ground-level images that were obtained in operation 1361, and using information associated with the ground-level images and the three-dimensional mesh to spatially align the ground-level images with respect to the three-dimensional mesh. As previously explained, a single area of the three-dimensional mesh may be textured using portions from multiple ones of the ground-level three-dimensional images, such as by averaging. The result of operation 1364 is a textured three-dimensional mesh. The textured three-dimensional mesh can be generated in operation 1364 in the manner described with respect to the modeling system 108 and the three-dimensional textured mesh 110.

Operation 1365 includes identifying a first portion of the textured three-dimensional mesh. The first portion of the textured three-dimensional mesh may include features that are present at ground-level, such as a ground surface and a roadway surface. The first portion of the three-dimensional mesh may be identified, for example, by analyzing the elevation of portions of the three-dimensional mesh. As one example, the portion of the three-dimensional mesh that has a lowest elevation (e.g., Z coordinate) at a particular lateral and longitudinal position (e.g., X and Y coordinate) may be determined to be part of the first portion of the textured three-dimensional mesh. As another example, the first portion of the textured three-dimensional mesh may be identified in the manner described with respect to the reference plane 1156.

Operation 1366 includes identifying a second portion of the textured three-dimensional mesh. The second portion of the textured three-dimensional mesh is a feature that obstructs visibility of part of the first portion of the textured three-dimensional mesh from an overhead perspective. The second portion of the textured three-dimensional mesh may be identified, for example, as described with respect to the rendering operation 540, the rendering operation 740, the rendering operation 940, or the rendering operation 1140.

As one example, the second portion of the three-dimensional mesh may be identified based on location of the second portion of the three-dimensional mesh above the first portion of the three-dimensional mesh. As another example the second portion of the textured three-dimensional mesh may be identified based on intersection of a projection line from the first portion of the three-dimensional textured mesh with the second portion of the textured three-dimensional mesh. As another example, the second portion of the textured three-dimensional mesh is identified using a clipping plane that is located between the first portion of the textured three-dimensional mesh and the second portion of the textured three-dimensional mesh.

Operation 1367 includes rendering a simulated overhead perspective image. For example, operation 1367 may include rendering a simulated overhead perspective image such that the second portion of the textured three-dimensional mesh is not represented in the simulated overhead perspective image. Operation 1367 may be performed, for example, in the manner described with respect to the rendering system 112, the rendering operation 540, the rendering operation 740, the rendering operation 940, or the rendering operation 1140.

In some implementations, rendering the simulated overhead perspective image includes removing the second portion from the textured three-dimensional mesh during rendering. In some implementations rendering the simulated overhead perspective image includes ignoring the second portion of the textured three-dimensional mesh during rendering. In some implementations, rendering the simulated overhead perspective image is performed using a projection plane that is positioned between the first portion of the textured three-dimensional mesh and the second portion of the textured three-dimensional mesh. In some implementations, rendering the simulated overhead perspective image is performed by causing the second portion of the textured three-dimensional mesh to be non-visible. In some implementations, rendering the simulated overhead perspective image is performed using a projection plane and projection lines that extend orthogonal to the projection plane.

Figure 14:
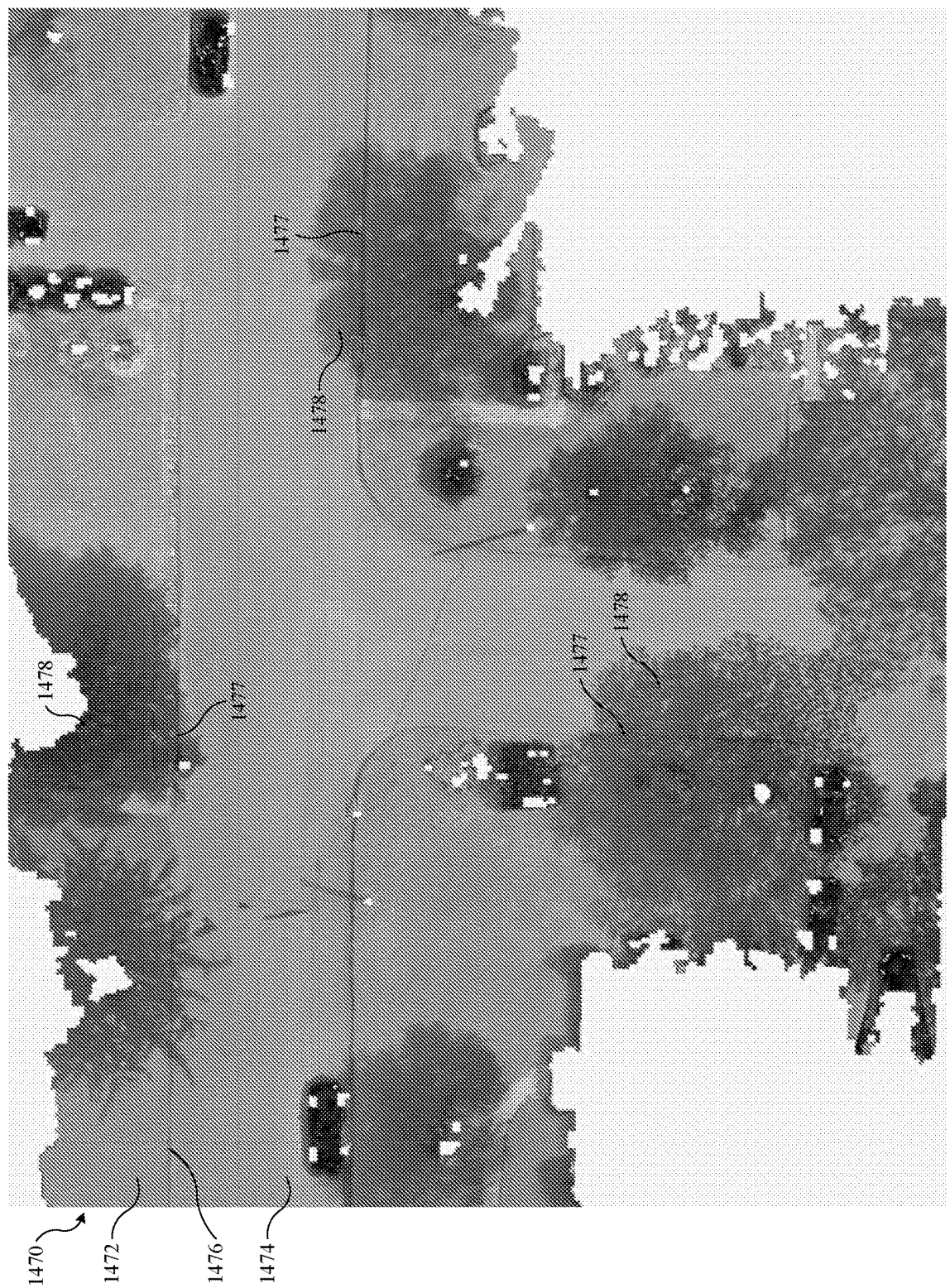
FIG. 14 is an example of an image generated from an overhead perspective using images captured at ground level.

FIG. 14 is an example of an image 1470 generated from an overhead perspective using images captured at ground level. The image 1470 may be generated, for example, by the system 100, using any of the methods that were described previously.

In the image 1470, a ground surface 1472 is visible, along with a roadway 1474 that has curbs 1476. Some obstructing objects have been removed during generation of the image 1470, such as trees, which are not visible in the image 1470. Instead, tree shadows 1478 that are cast on the ground surface 1472 are visible. Because obstructing objects, such as the trees, are not visible in the image 1470, features that would otherwise be occluded by the obstructing objects are visible. For example, curb portions 1477 are visible within the tree shadows 1478 but would otherwise be occluded if the trees were present in the image 1470.

Figure 15:
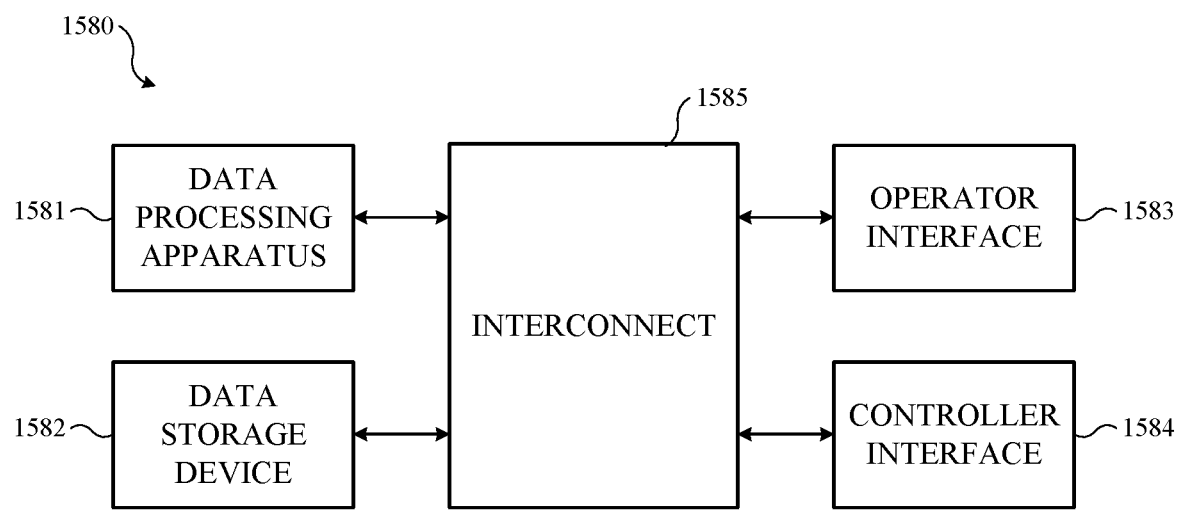
FIG. 15 is a block diagram that shows an example hardware configuration for a controller.

FIG. 15 is a block diagram that shows an example hardware configuration for a controller 1580 that may be utilized to implement some or all of the systems that are described herein, such as the system 100 or components of the system 100. The controller 1580 includes a data processing apparatus 1581, a data storage device 1582, an operator interface 1583, a controller interface 1584, and an interconnect 1585 through which the data processing apparatus 1581 may access the other components. The data processing apparatus 1581 is operable to execute instructions that have been stored in a data storage device 1582. In some implementations, the data processing apparatus 1581 is a processor with random access memory for temporarily storing instructions read from the data storage device 1582 while the instructions are being executed. For example, the data storage device 1582 may be a non-volatile information storage device such as a hard drive or a solid-state drive. The operator interface 1583 facilitates communication with a user of the controller 1580 and may include any type of human-machine interface such as buttons, switches, a touch-screen input device, a gestural input device, an audio input device, a display, and/or a speaker. The controller interface 1584 allows input and output of information to other systems, as examples, for allowing display at an external system or for allowing automated control of another system. The interconnect 1585 may be, as examples, a system bus, a wired network, or a wireless network.

What is claimed is:

1. A method, comprising:
   obtaining, by a computing device, a three-dimensional model that represents a natural environment;
   identifying, by the computing device, ground-level surfaces from the three-dimensional model, wherein the ground-level surfaces from the three-dimensional model represent ground-level features from the natural environment;
   identifying, by the computing device, overhanging features from the three-dimensional model by determining that the overhanging features from the three-dimensional model block visibility of the ground-level surfaces from the three-dimensional model when the ground-level surfaces are viewed from an orthographic perspective; and
   rendering a simulated image of the natural environment that includes at least some of the ground-level surfaces from the natural environment using a rendering system that generates the simulated image of the natural environment according to the orthographic perspective and ignores the overhanging features from the three-dimensional model so that the overhanging features from the three-dimensional model are omitted from the simulated image of the natural environment.

2. The method of claim 1, wherein:
   identifying the overhanging features from the three-dimensional model includes defining a projection plane, defining projection lines that extend generally perpendicular to the projection plane and extend from the projection plane to the three-dimensional model, and determining that a portion of the three-dimensional model is one of the overhanging features based on collision of one of the projection lines with the portion of the three-dimensional model, and
   rendering the simulated image of the natural environment includes using the projection plane to form the simulated image by simulating projection of light from the ground-level surfaces of the three-dimensional model along the projection lines while ignoring the overhanging features from the three-dimensional model.

3. The method of claim 1, wherein:
identifying the overhanging features from the three-dimensional model includes defining a clipping plane that is located above a maximum elevation of the ground-level surfaces of the three-dimensional model and determining that a portion of the three-dimensional model that is located above the clipping plane is one of the overhanging features, and
rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

4. The method of claim 1, wherein:
identifying the overhanging features from the three-dimensional model includes applying semantic labels to portions of the three-dimensional model, and determining that one of the portions of the three-dimensional model is one of the overhanging features according to the semantic labels, and
rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

5. The method of claim 4, wherein applying the semantic labels to portions of the three-dimensional model includes classifying the portions of the three-dimensional model using an automated classifier system.

6. The method of claim 1, wherein:
identifying the overhanging features from the three-dimensional model includes defining a reference plane that is located above a first group of the ground-level surfaces and is located below a second group of the ground-level surfaces, and determining that a portion of the three-dimensional model that is located above the reference plane is one of the overhanging features, and
rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

7. The method of claim 1, wherein obtaining the three-dimensional model includes:
obtaining images that were captured at ground level using a camera,
obtaining three-dimensional surface measurements using a three-dimensional sensor,
defining a three-dimensional mesh using the three-dimensional surface measurements, and
texturing the three-dimensional mesh using the images to define the three-dimensional model.

8. A non-transitory computer-readable storage device including program instructions executable by one or more processors that, when executed, cause the one or more processors to perform operations, the operations comprising:
obtaining, by the one or more processors, three-dimensional model that represents a natural environment;
identifying, by the one or more processors, ground-level surfaces from the three-dimensional model, wherein the ground-level surfaces from the three-dimensional model represent ground-level features from the natural environment;
identifying, by the one or more processors, overhanging features from the three-dimensional model by determining that the overhanging features from the three-dimensional model block visibility of the ground-level surfaces from the three-dimensional model when the ground-level surfaces are viewed from an orthographic perspective; and
rendering a simulated image of the natural environment that includes at least some of the ground-level surfaces from the natural environment using a rendering system that generates the simulated image of the natural environment according to the orthographic perspective and ignores the overhanging features from the three-dimensional model so that the overhanging features from the three-dimensional model are omitted from the simulated image of the natural environment.

9. The non-transitory computer-readable storage device of claim 8, wherein:
identifying the overhanging features from the three-dimensional model includes defining a projection plane, defining projection lines that extend generally perpendicular to the projection plane and extend from the projection plane to the three-dimensional model, and determining that a portion of the three-dimensional model is one of the overhanging features based on collision of one of the projection lines with the portion of the three-dimensional model, and
rendering the simulated image of the natural environment includes using the projection plane to form the simulated image by simulating projection of light from the ground-level surfaces of the three-dimensional model along the projection lines while ignoring the overhanging features from the three-dimensional model.

10. The non-transitory computer-readable storage device of claim 8, wherein:
identifying the overhanging features from the three-dimensional model includes defining a clipping plane that is located above a maximum elevation of the ground-level surfaces of the three-dimensional model and determining that a portion of the three-dimensional model that is located above the clipping plane is one of the overhanging features, and
rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

11. The non-transitory computer-readable storage device of claim 8, wherein:
- identifying the overhanging features from the three-dimensional model includes applying semantic labels to portions of the three-dimensional model, and determining that one of the portions of the three-dimensional model is one of the overhanging features according to the semantic labels, and
- rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

12. The non-transitory computer-readable storage device of claim 11, wherein applying the semantic labels to portions of the three-dimensional model includes classifying the portions of the three-dimensional model using an automated classifier system.

13. The non-transitory computer-readable storage device of claim 8, wherein:
- identifying the overhanging features from the three-dimensional model includes defining a reference plane that is located above a first group of the ground-level surfaces and is located below a second group of the ground-level surfaces, and determining that a portion of the three-dimensional model that is located above the reference plane is one of the overhanging features, and
- rendering the simulated image of the natural environment includes defining a projection plane, defining projection lines that extend generally perpendicular to the projection plane and extend from the projection plane to the three-dimensional model, and using the projection plane to form the simulated image by simulating projection of light from the ground-level surfaces of the three-dimensional model along the projection lines while ignoring the overhanging features from the three-dimensional model.

14. The non-transitory computer-readable storage device of claim 8, wherein obtaining the three-dimensional model includes:
- obtaining images that were captured at ground level using a camera,
- obtaining three-dimensional surface measurements that were captured using a three-dimensional sensor,
- defining a three-dimensional mesh using the three-dimensional surface measurements, and
- texturing the three-dimensional mesh using the images to define the three-dimensional model.

15. A system, comprising:
- a memory; and
- a processor configured to execute instructions stored in the memory to:
- obtain, by the processor, a three-dimensional model that represents a natural environment;
- identify, by the processor, ground-level surfaces from the three-dimensional model, wherein the ground-level surfaces from the three-dimensional model represent ground-level features from the natural environment;
- identify, by the processor, overhanging features from the three-dimensional model by determining that the overhanging features from the three-dimensional model block visibility of the ground-level surfaces from the three-dimensional model when the ground-level surfaces are viewed from an orthographic perspective; and
- render a simulated image of the natural environment that includes at least some of the ground-level surfaces from the natural environment using a rendering system that generates the simulated image of the natural environment according to the orthographic perspective and ignores the overhanging features from the three-dimensional model so that the overhanging features from the three-dimensional model are omitted from the simulated image of the natural environment.

16. The system of claim 15, wherein:
- the instructions to identify the overhanging features from the three-dimensional model include instructions to define a projection plane, define projection lines that extend generally perpendicular to the projection plane and extend from the projection plane to the three-dimensional model, and determine that a portion of the three-dimensional model is one of the overhanging features based on collision of one of the projection lines with the portion of the three-dimensional model, and
- the instructions to render the simulated image of the natural environment include instructions to use the projection plane to form the simulated image by simulating projection of light from the ground-level surfaces of the three-dimensional model along the projection lines while ignoring the overhanging features from the three-dimensional model.

17. The system of claim 15, wherein:
- the instructions to identify the overhanging features from the three-dimensional model include instructions to define a clipping plane that is located above a maximum elevation of the ground-level surfaces of the three-dimensional model and determine that a portion of the three-dimensional model that is located above the clipping plane is one of the overhanging features, and
- the instructions to render the simulated image of the natural environment include instructions to define a projection plane, define projection lines that extend generally perpendicular to the projection plane and extend from the projection plane to the three-dimensional model, and use the projection plane to form the simulated image by simulating projection of light from the ground-level surfaces of the three-dimensional model along the projection lines while ignoring the overhanging features from the three-dimensional model.

18. The system of claim 15, wherein:
- the instructions to identify the overhanging features from the three-dimensional model include instructions to apply semantic labels to portions of the three-dimensional model, and determine that one of the portions of the three-dimensional model is one of the overhanging features according to the semantic labels, and
- the instructions to render the simulated image of the natural environment include instructions to define a projection plane, define projection lines that extend generally perpendicular to the projection plane and extend from the projection plane to the three-dimensional model, and use the projection plane to form the simulated image by simulating projection of light from the ground-level surfaces of the three-dimensional model along the projection lines while ignoring the overhanging features from the three-dimensional model.

19. The system of claim 18, wherein the instructions to apply the semantic labels to portions of the three-dimensional model include instructions to classify the portions of the three-dimensional model using an automated classifier system.

20. The system of claim 15, wherein:
the instructions to identify the overhanging features from the three-dimensional model include instructions to define a reference plane that is located above a first group of the ground-level surfaces and is located below a second group of the ground-level surfaces, and determine that a portion of the three-dimensional model that is located above the reference plane is one of the overhanging features, and
the instructions to render the simulated image of the natural environment include instructions to define a projection plane, define projection lines that extend generally perpendicular to the projection plane and extend from the projection plane to the three-dimensional model, and use the projection plane to form the simulated image by simulating projection of light from the ground-level surfaces of the three-dimensional model along the projection lines while ignoring the overhanging features from the three-dimensional model.

21. The system of claim 15, wherein the instructions to obtain the three-dimensional model include instructions to:
obtain images that were captured at ground level using a camera,
obtain three-dimensional surface measurements that were captured using a three-dimensional sensor,
define a three-dimensional mesh using the three-dimensional surface measurements, and
texture the three-dimensional mesh using the images to define the three-dimensional model.

* * * * *

UNITED STATES PATENT AND TRADEMARK OFFICE
CERTIFICATE OF CORRECTION

PATENT NO. : 11,189,082 B2  
APPLICATION NO. : 17/007686  
DATED : November 30, 2021  
INVENTOR(S) : Ibrahim Musba et al.

Page 1 of 1

It is certified that error appears in the above-identified patent and that said Letters Patent is hereby corrected as shown below:

In the Claims

At Column 16, Claim number 8, Line number 9, "processors, three-dimensional model" should be --processors, a three-dimensional model--.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*